United States Patent
Jaquinta

(10) Patent No.: US 7,610,187 B2
(45) Date of Patent: Oct. 27, 2009

(54) LINGUAL TRANSLATION OF SYNDICATED CONTENT FEEDS

(75) Inventor: Joseph M. Jaquinta, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 11/171,119

(22) Filed: Jun. 30, 2005

(65) Prior Publication Data

US 2007/0005339 A1    Jan. 4, 2007

(51) Int. Cl.
G06F 17/28    (2006.01)
G06F 15/16    (2006.01)

(52) U.S. Cl. .................... 704/3; 704/2; 704/8; 709/217
(58) Field of Classification Search ........................ None
See application file for complete search history.

(56) References Cited

U.S. PATENT DOCUMENTS

| | | | |
|---|---|---|---|
| 2002/0026462 A1 | 2/2002 | Shotton, Jr. et al. | |
| 2002/0091789 A1 | 7/2002 | Katariya et al. | |
| 2003/0097421 A1 | 5/2003 | Wille et al. | |
| 2004/0225749 A1 | 11/2004 | Pavlik et al. | |
| 2005/0137873 A1* | 6/2005 | Liu | 704/270.1 |
| 2005/0267973 A1* | 12/2005 | Carlson et al. | 709/228 |
| 2006/0217126 A1* | 9/2006 | Sohm et al. | 455/454 |
| 2007/0016563 A1* | 1/2007 | Omoigui | 707/3 |

OTHER PUBLICATIONS

Dolan, B. et al. "Unsupervised construction of large paraphrase corpora: exploiting massively parallel news sources," International Conference On Computational Linguistics, Art. No. 350, 2004.*

* cited by examiner

Primary Examiner—Matthew J Sked
(74) Attorney, Agent, or Firm—Stephen T. Keohane, Esq.; Steven M. Greenberg, Esq.; Carey, Rodriguez, Greenberg & Paul, LLP

(57) ABSTRACT

A method, system and apparatus for processing multi-lingual syndicated content feeds is provided. In an embodiment of the invention, the system can include a syndicated content aggregator configured for coupling to multiple syndicated content subscribers and syndicated content feed sources. The system also can include a translation server coupled to the aggregator. The translation server can include logic to translate syndicated content feeds, such as RSS or Atom feeds, which are received from the feed sources into target lingual languages specified by the aggregator. In this regard, the translation server can include a machine translator configured to translate content from a first lingual language to a second lingual language.

7 Claims, 2 Drawing Sheets

LINGUAL TRANSLATION OF SYNDICATED CONTENT FEEDS

BACKGROUND OF THE INVENTION

1. Field of the Invention

The present invention relates to the field of content syndication and more particularly to processing multi-lingual syndication feeds.

2. Description of the Related Art

Content syndication refers to the selective broadcasting of content fragments over a data communications network to a multiplicity of subscribers. Arising in part due to the overwhelming volume of content available for access throughout the global Internet, content syndication provides the ability for subscribers to identify content which is desirable. Once a subscriber has identified desirable content, an aggregation mechanism can periodically retrieve content fragments that are consistent with the identified content from specified content sources and can combine the retrieved content into a cohesive, singular document for review by the subscriber. The Really Simple Syndication (RSS) format and the Atom format represent two exemplary content syndication implementations.

Notably, the RSS format is a content syndication format that has become increasingly popular. RSS is an XML-based format that allows the syndication of content ranging from lists of hyperlinks to blog postings. To enable the syndication of content, a Web site can publish an RSS feed, or channel. Once a feed becomes available, content browsers can regularly fetch the RSS feed to receive the most recently published content in the channel.

Presently, many commercial news services now provide news in the RSS format. Additionally most of the major Web sites for producing personal and professional web logs, known in the art as "blogs" also are making content available in the RSS format. The reason for the explosive growth of RSS is that having an application neutral format for content enables Web sites, Web services and other aggregator applications to be written to merge content from a diverse number of sources into a custom experience containing just what the user prefers. Since individuals can now select the source of their news updates at a low level of granularity, many now produce content both in a native format and in an RSS format.

The language of most RSS content is in the English language. Yet, the English language is not the native language of the majority of Internet users. It is to be noted, however, that a great deal of interesting content is published through RSS feeds, not in English, but in other lingual languages. For example, because of the simplicity of publishing an RSS new stream, some of the most interesting news related RSS feeds of the day, originate from political hot spots in the world and contain the personal views of events in lingual languages such as Arabic, Hebrew, French, Spanish, Italian, German, Chinese, Japanese, Korean and Russian, to name only a few.

BRIEF SUMMARY OF THE INVENTION

Embodiments of the present invention address deficiencies of the art in respect to processing multi-lingual syndication feeds and provide a novel and non-obvious method, system and apparatus for the translation of a content syndication feed. In one embodiment, a method for processing multi-lingual syndicated content feeds can include identifying a target lingual language for requested content in a syndicated content feed and receiving the syndicated content feed from a syndicated content source. The syndicated content feed can include, for instance, an RSS feed or an Atom feed though it is to be recognized that other syndicated content feed types can suffice. The method further can include translating the received syndicated content feed from a native lingual language into the target lingual language, and providing the translated content feed in the target lingual language to an aggregator for incorporation in an aggregation of syndicated content.

The identifying of a target lingual language for requested content in a syndicated content feed can include identifying a target lingual language from within a request for requested content in a syndicated content feed. Alternatively, the target lingual language can be pre-specified in a communicatively coupled registry. In either case, the translation of the received syndicated content feed from a native lingual language into the target lingual language can include machine translating the received syndicated content feed. The method further can include converting the received content feed from a format suitable for aggregation into a format suitable for machine translating, and converting the machine translated content feed back into a format suitable for aggregation.

In another embodiment, a system for processing multi-lingual syndicated content feeds can include a syndicated content aggregator configured for coupling to multiple syndicated content subscribers and syndicated content feed sources. The system also can include a translation server coupled to the aggregator. The translation server can include logic to translate syndicated content feeds, for example RSS or Atom feeds, which are received from the feed sources into target lingual languages specified by the aggregator. In this regard, the translation server can include a machine translator configured to translate content from a first lingual language to a second lingual language.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the translation of syndicated content. In accordance with an embodiment of the present invention, syndicated content can be translated intermediately to a content aggregator and the source of the syndicated content. Specifically, the syndicated content can be provided in a native lingual language and translated into a specified lingual language prior to aggregating the syndicated content with other syndicated content for delivery to a subscribing client. In this way, the subscribing client can access additional syndicated content feeds even though the feeds may provide content in a native language not readily understood by the subscribing client.

Figure 1:
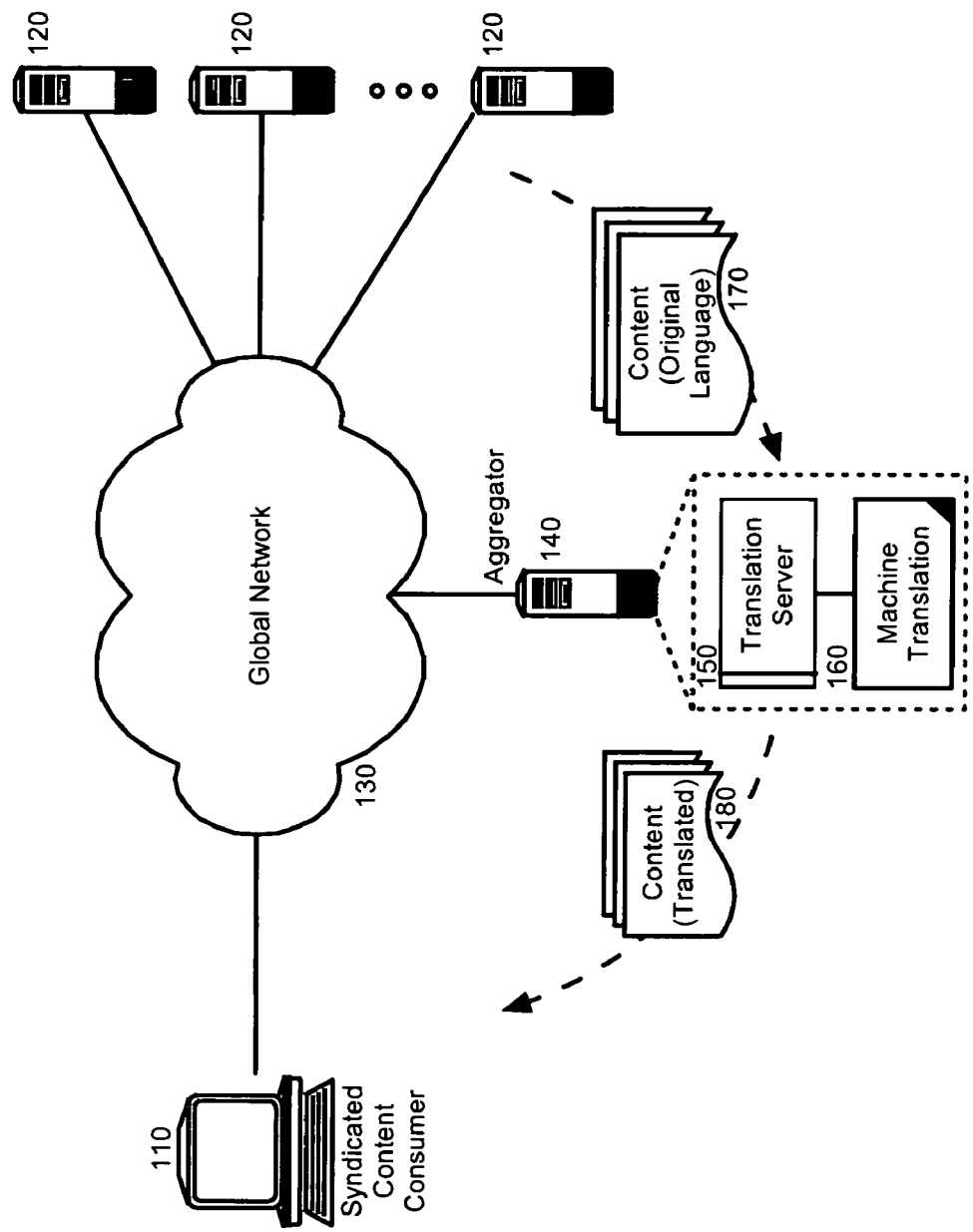
FIG. 1 is a schematic illustration of a system configured for the translation of syndicated content feeds; and, FIG. 2 is a flow chart illustrating a process for translating syndicated content feeds.

In further illustration, FIG. 1 is a schematic illustration of a system configured for the translation of syndicated content feeds. The system can include an aggregator 140 disposed between a syndicated content subscribing consumer 110 and one or more syndicated content providers 120 over a global computer communications network 130. The aggregator 140 can be configured to retrieve syndicated content feeds for designated ones of the syndicated content providers 120. The aggregator 140 further can be configured to aggregate the retrieved syndicated content into a document which can be delivered to the syndicated content subscribing consumer 110.

The aggregator 140 can be coupled to a translation server 150, either directly where the translation server 150 is incorporated as part of the aggregator 140, or communicatively over the network 130 where the translation server 150 is separately executing logic. The translation server 150 can be configured to receive and process requests to retrieve syndicated content 170 from the syndicated content providers 120 from the aggregator 140. The translation server 150 further can be configured to translate the retrieved syndicated content 170 from a native lingual language to a specified lingual language to produce translated content 180 and to provide the translated content 180 to the aggregator 140 for routing to the syndicated content consumer 110. To facilitate the translation of the retrieved syndicated content 170, machine translation logic 160 coupled to the translation server 150 can translate provided content from one lingual language to another.

Figure 2:
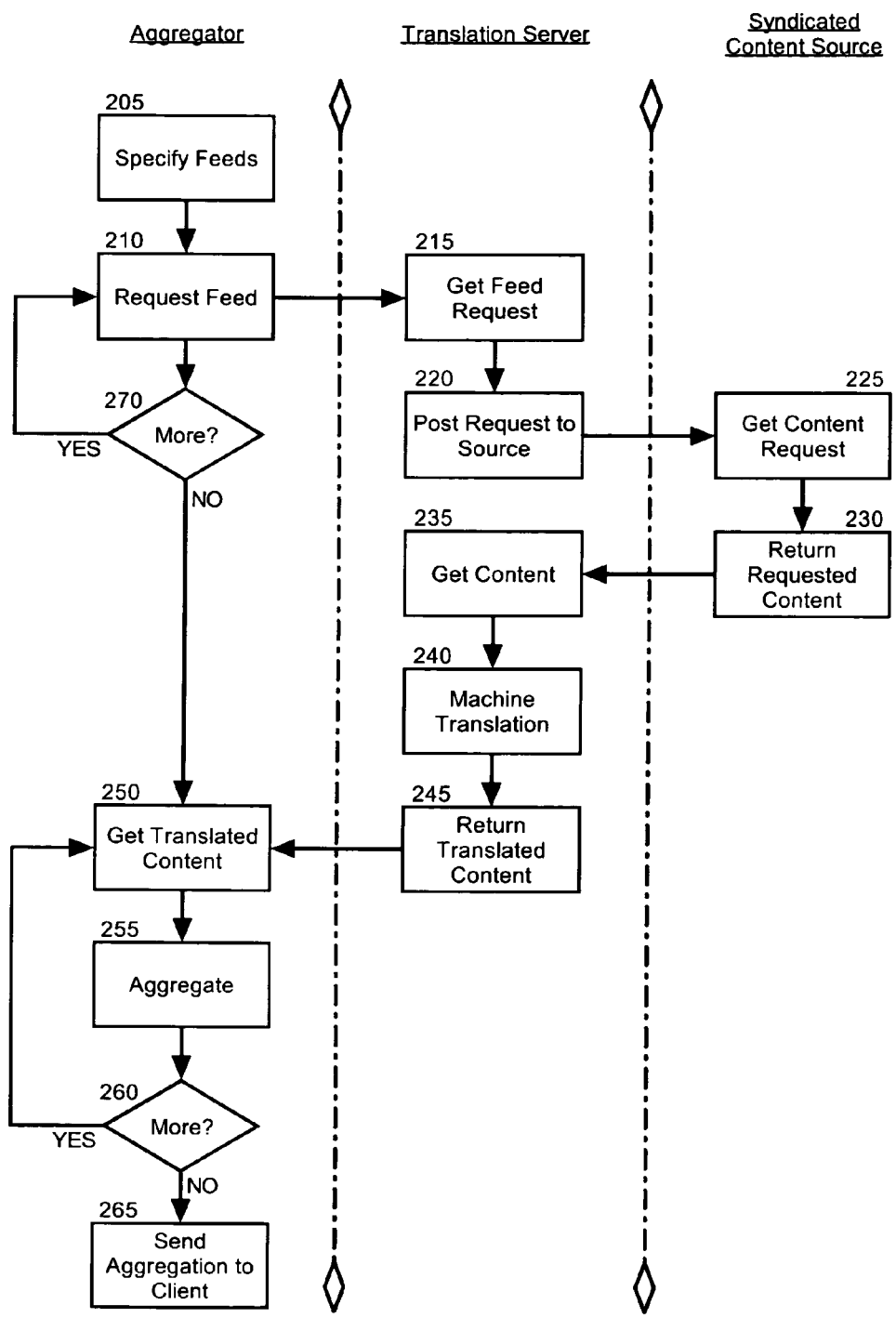

In more particular illustration of the operation of the system of FIG. 1, FIG. 2 is a flow chart illustrating a process for machine translating syndicated content feeds. Beginning in block 205 in the aggregator, one or more syndicated content feeds can be specified for aggregation. In block 210, a request for content from a first feed can be provided to the translation server. Consequently, in block 215 the translation server can receive the feed request and in block 220, the translation server can post the request to a syndicated content source associated with the feed request. In decision block 270, if additional requests remain to be processed for additional feeds, in block 210 the additional requests can be forwarded to the translation server.

In block 225, the syndicated content source can receive the request and in block 230, the syndicated content source can return the requested content. In block 235, the translation server can receive the content returned by the content source and the translation server can pass the returned content to the machine translation logic for translation block 240. Optionally, the translation server can format the returned content so that the formatted returned content can be processed within the machine translation logic. In any case, in block 245, once the machine translation logic has translated the returned content into a specified lingual language, the translation server can return the translated form of the requested content to the aggregator.

In block 250, the aggregator can receive the translated content which the aggregator can aggregate in block 255 in a single document. If in decision block 260 additional translated content is to be received, the process can be received in block 250 and aggregated in block 255. When no additional translated content remains to be received in decision block 260, the aggregation can be forwarded to the syndicated content subscriber in block 265.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for processing multi-lingual syndicated content feeds comprising:
    identifying a target lingual language for requested content in a syndicated content feed;
    receiving said syndicated content feed from a syndicated content source;
    translating said received syndicated content feed from a native lingual language into said target lingual language; and,
    providing said translated content feed in said target lingual language to an aggregator for incorporation in an aggregation of syndicated content.

2. The method of claim 1, wherein said identifying a target lingual language for requested content in a syndicated content feed comprises identifying a target lingual language from within a request for requested content in a syndicated content feed.

3. The method of claim 1, wherein said identifying a target lingual language for requested content in a syndicated content feed comprises identifying a target lingual language from within a communicatively coupled registry.

4. The method of claim 1, wherein said translating said received syndicated content feed from a native lingual language into said target lingual language comprises machine translating said received syndicated content feed.

5. The method of claim 4, further comprising the steps of:
   converting said received content feed from a format suitable for aggregation into a format suitable for machine translating; and,
   converting said machine translated content feed back into a format suitable for aggregation.

6. The method of claim 1, wherein said syndicated content feed is a Really Simple Syndication (RSS) feed.

7. The method of claim 1, wherein said syndicated content feed is an Atom feed.

* * * * *